United States Patent
Takagi et al.

(10) Patent No.: US 11,732,116 B2
(45) Date of Patent: Aug. 22, 2023

(54) RUBBER COMPOSITION FOR TIRE TREAD AND TIRE

(71) Applicant: Sumitomo Rubber Industries, Ltd., Hyogo (JP)

(72) Inventors: Keiji Takagi, Kobe (JP); Tatsuya Miyazaki, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 325 days.

(21) Appl. No.: 17/259,460

(22) PCT Filed: Aug. 6, 2019

(86) PCT No.: PCT/JP2019/030955
§ 371 (c)(1),
(2) Date: Jan. 11, 2021

(87) PCT Pub. No.: WO2020/032053
PCT Pub. Date: Feb. 13, 2020

(65) Prior Publication Data
US 2021/0277212 A1    Sep. 9, 2021

(30) Foreign Application Priority Data
Aug. 9, 2018  (JP) ................. 2018-150693

(51) Int. Cl.
*C08L 9/06* (2006.01)
(52) U.S. Cl.
CPC ........... *C08L 9/06* (2013.01); *C08L 2205/025* (2013.01); *C08L 2205/035* (2013.01)
(58) Field of Classification Search
CPC ........................................ C08L 9/06
USPC ........................................ 524/314
See application file for complete search history.

(56) References Cited

U.S. PATENT DOCUMENTS

| | | | | |
|---|---|---|---|---|
| 4,261,403 A | * | 4/1981 | Imai .......................... | B60C 9/18 152/209.5 |
| 2003/0004249 A1 | | 1/2003 | Yagi et al. | |
| 2010/0324168 A1 | * | 12/2010 | Takizawa .................. | C08L 9/06 523/150 |
| 2016/0046781 A1 | | 2/2016 | Miyazaki | |
| 2018/0229554 A1 | * | 8/2018 | Suzuki ...................... | C08L 9/00 |

FOREIGN PATENT DOCUMENTS

| | | | | |
|---|---|---|---|---|
| CN | 104277260 A | * | 1/2015 | .......... B60C 1/0016 |
| CN | 104327322 A | | 2/2015 | |
| CN | 105143335 A | | 12/2015 | |
| CN | 106009096 A | | 10/2016 | |
| CN | 106084335 A | | 11/2016 | |
| CN | 107955276 A | | 4/2018 | |
| JP | H11-199711 A | * | 7/1999 | |
| JP | 2002-338750 A | | 11/2002 | |
| JP | 2011-122112 A | | 6/2011 | |
| JP | 2013-170233 A | | 9/2013 | |
| JP | 2015-502444 A | | 1/2015 | |
| WO | 2013-093072 A1 | | 6/2013 | |

OTHER PUBLICATIONS

The extended European search report issued by the European Patent Office dated Jun. 29, 2021, which corresponds to European Patent Application No. 19848640.9-1102 and is related to U.S. Appl. No. 17/259,460.
Notification of Transmillal of Translation of the International Preliminary Report on Patentability and Translation of Written Opinion of the International Searching Authority; PCT/JP2019/030955; dated Feb. 18, 2021.
International Search Report issued in PCT/JP2019/030955; dated Oct. 8, 2019.
An Office Action mailed by China National Intellectual Property Administration dated Jul. 5, 2022, which corresponds to Chinese Patent Application No. 201980044761.8 and is related to U.S. Appl. No. 17/259,460 with English language translation.

* cited by examiner

*Primary Examiner* — Deve V Hall
(74) *Attorney, Agent, or Firm* — Studebaker & Brackett PC

(57) ABSTRACT

According to the rubber composition for a tire tread comprising a diene-based rubber component, and, based on 100 parts by mass of the diene-based rubber component, 0.5 to 6.0 parts by mass of a branched alkane of 40 to 70 carbon atoms, 0.05 to 3.5 parts by mass of a linear alkane of 45 or more carbon atoms and 1 to 35 parts by mass of aluminum hydroxide, and a tire comprising tread composed of the rubber composition for a tire tread of the present invention, a rubber composition for a tire tread capable of improving initial wet grip performance can be provided, thereby providing a tire having such improved initial wet grip performance.

12 Claims, No Drawings

RUBBER COMPOSITION FOR TIRE TREAD AND TIRE

TECHNICAL FIELD

The present invention relates to a rubber composition for a tire tread and a tire.

BACKGROUND ART

Wet grip performance is required for a tire tread which comes into contact with a road surface from the viewpoint of safety, etc. For improving wet grip performance of a rubber composition, a method is exemplified which raises glass transition temperature (Tg) of the rubber composition by adding resin. However, it often accompanies a problem that initial wet grip performance deteriorates. In addition, as another means to improve wet grip performance, a method of improving the performance by adding aluminum hydroxide has been proposed (Patent Document 1).

PRIOR ART DOCUMENT

Patent Document

Patent Document 1: JP 2002-338750 A

SUMMARY OF THE INVENTION

Problem to be Solved by the Invention

However, there is room for further improvement in initial wet grip performance even for the rubber composition described in Patent Document 1.

It is an object of the present invention to provide a rubber composition for a tire tread which can improve initial wet grip performance and a tire having such improved initial wet grip performance.

Means to Solve the Problem

In view of the problem above, the present inventors have found that even a rubber composition for a tread comprising aluminum hydroxide can improve in initial wet grip performance of a tire by comprising a predetermined amount of each of a branched alkane of 40 to 70 carbon atoms and a linear alkane of 45 or more carbon atoms, and completed the present invention.

That is, the present disclosure relates to:

[1] A rubber composition for a tire tread, comprising a diene-based rubber component, and, based on 100 parts by mass of the diene-based rubber component, 0.50 to 6.00 parts by mass, preferably 1.00 to 5.50 parts by mass, more preferably 1.50 to 5.00 parts by mass, or preferably 0.50 to 5.50 parts by mass, more preferably 0.50 to 5.00 parts by mass, more preferably 0.50 to 3.20 parts by mass, more preferably 0.50 to 1.30 parts by mass, further preferably 1.18 to 1.30 parts by mass of a branched alkane of 40 to 70 carbon atoms, 0.05 to 3.50 parts by mass, preferably 0.50 to 3.00 parts by mass, more preferably 1.00 to 2.50 parts by mass, or preferably 0.05 to 3.00 parts by mass, more preferably 0.05 to 2.50 parts by mass, more preferably 0.11 to 2.50 parts by mass, more preferably 0.11 to 1.70 parts by mass, more preferably 0.11 to 0.75 parts by mass, more preferably 0.30 to 0.70 parts by mass, further preferably 0.40 to 0.45 parts by mass of a linear alkane of 45 or more carbon atoms and 1 to 35 parts by mass, preferably 3 to 30 parts by mass, more preferably 5 to 30 parts by mass, more preferably 5 to 25 parts by mass, further preferably 10 to 21 parts by mass, most preferably 20 parts by mass or less, or preferably 15 to 35 parts by mass, more preferably 15 to 25 parts by mass, or preferably 21 to 30 parts by mass, and more preferably 21 to 23 parts by mass of aluminum hydroxide,

[2] The rubber composition for a tire tread of [1] above, wherein a dynamic coefficient of friction measured with a dynamic friction tester is 0.85 or more, preferably 0.85 to 1.20, more preferably 0.85 to 1.15 under measurement conditions of a speed at 7.8 km/h, a temperature at 20° C., and a water layer thickness of 2 mm±1 mm,

[3] The rubber composition for a tire tread of [2] above, wherein the dynamic coefficient of friction is 0.90 or more, preferably 0.90 to 1.20, more preferably 0.90 to 1.15,

[4] The rubber composition for a tire tread of [3] above, wherein the dynamic coefficient of friction is 0.95 or more, preferably 0.95 to 1.20, more preferably 0.95 to 1.15, or more preferably 1.00 or more, more preferably 1.10 or more, further preferably 1.20 or more, and

[5] A tire comprising a tread composed of the rubber composition for a tire tread of any of [1]-[4] above.

Effects of the Invention

According to the present invention, a rubber composition for a tire tread capable of improving initial wet grip performance can be provided by comprising a predetermined amount of each of aluminum hydroxide, a branched alkane of 40 to 70 carbon atoms, and a linear alkane of 45 or more carbon atoms in addition to a diene-based rubber component, and a tire having improved initial grip performance can be provided by comprising a tread composed of the rubber composition for a tire tread.

EMBODIMENT FOR CARRYING OUT THE INVENTION

<Rubber Composition for a Tire Tread>

The rubber composition for a tire tread which is an embodiment of the present invention comprises a diene-based rubber component, and, based on 100 parts by mass of the diene-based rubber component, 0.5 to 6.0 parts by mass of a branched alkane of 40 to 70 carbon atoms, 0.05 to 3.5 parts by mass of a linear alkane of 45 or more carbon atoms and 1 to 35 parts by mass of aluminum hydroxide, and can improve initial wet grip performance. Besides, in the present specification, a numerical range indicated with "to" includes the numerical values of both ends.

The reason why such improvement effect of initial wet grip performance can be obtained is considered as follows. It is considered that aluminum hydroxide spread in a planar shape on the tread surface increases the contact area with the road surface. Then, if a wax, such as a microcrystalline wax, comprising a predetermined amount of a branched alkane and a linear alkane exists on the surface of or in the vicinity of aluminum hydroxide and forms a relatively soft layer, which allows the tread surface to follow the road surface of wide area. That is, it is considered that initial wet grip performance improves due to the synergistic effect of aluminum hydroxide with a wax comprising a predetermined amount of a branched alkane and a linear alkane, such as a microcrystalline wax.

In addition, when a liquid SBR is further comprised, the liquid SBR appears on the surface from between branched alkanes, and thus it is considered that the above-mentioned effect can be further synergistically increased.

In the present specification, the dynamic coefficient of friction is a dynamic coefficient of friction measured with a dynamic friction tester under measurement conditions of a speed at 7.8 km/h, a temperature at 20° C., and a water layer thickness of 2 mm±1 mm.

The dynamic coefficient of friction of the rubber composition for a tire tread is preferably 0.85 or more, more preferably 0.90 or more, more preferably 0.95 or more, more preferably 1.00 or more, further preferably 1.10 or more. When the dynamic coefficient of friction is 0.85 or more, sufficient initial wet grip performance tends to be obtainable. Furthermore, the upper limit of the dynamic coefficient of friction is not particularly limited, but preferably 1.20 or less, more preferably 1.15 or less, from the reason that the higher the initial wet grip performance is, the easier the abrasion resistance of the tread rubber lowers. In another aspect, the dynamic coefficient of friction is preferably 1.20 or more from the viewpoint that the improvement effect of initial wet grip performance can be more favorably demonstrated.

(Diene-Based Rubber Component)

Examples of the diene-based rubber include, but not particularly limited to, a natural rubber (NR), an isoprene rubber (IR), a butadiene rubber (BR), a styrene-butadiene rubber (SBR), a styrene-isoprene rubber (SIR), a styrene-isoprene-butadiene rubber (SIBR), an ethylene-propylene-diene rubber (EPDM), a chloroprene rubber (CR), an acrylonitrile-butadiene rubber (NBR), a butyl rubber (IIR), and the like. The diene-based rubber may be used in combination. Among them, a SBR is preferably comprised from the viewpoint that more excellent grip performance can be obtained.

Examples of the SBR include, but not particularly limited to, a solution-polymerized SBR (S-SBR), an emulsion-polymerized SBR (E-SBR), modified SBRs thereof (a modified S-SBR, a modified E-SBR), and the like. Examples of the modified SBR include a SBR modified at its terminal and/or main chain, a modified SBR coupled with tin, a silicon compound, or the like (a modified SBR of condensate or having a branched structure, etc.), a SBR added with hydrogen (a hydrogenated SBR), and the like. Besides, a SBR may be oil-extended.

Among them, a modified SBR is preferably used. The modified SBR is not particularly limited, and both solution-polymerized SBR (S-SBR) and emulsion-polymerized SBR (E-SBR) can be used. Furthermore, a SBR modified at its terminal as well as main chain and a modified SBR coupled with tin, a silicon compound, or the like (the SBR of condensate or having a branched structure, etc.) can also be used. A terminal modifying group is not particularly limited as long as it has affinity with silica, and examples of the group to be introduced include, for example, an alkoxysilyl group, an amino group, a hydroxyl group, a glycidyl group, an amide group, a carboxyl group, an ether group, a thiol group, a cyano group, a hydrocarbon group, an isocyanate group, an imino group, an imidazole group, an urea group, a carbonyl group, an oxycarbonyl group, a sulfide group, a disulfide group, a sulfonyl group, a sulfinyl group, a thiocarbonyl group, an ammonium group, an imide group, a hydrazo group, an azo group, a diazo group, a nitrile group, a pyridyl group, an alkoxy group, an oxy group, an epoxy group, a metal atom such as tin and titanium, and the like. In addition, these functional groups may have a substituent. Among them, a primary, secondary, or tertiary amino group (especially, a glycidylamino group), an epoxy group, a hydroxyl group, an alkoxy group (preferably, an alkoxy group having 1 to 6 carbon atoms), an alkoxysilyl group (preferably, an alkoxysilyl group having 1 to 6 carbon atoms), and a hydrocarbon group are preferred. The modified SBR can be prepared by, for example, a method described in JP 2014-019841 A.

The styrene content of the SBR is not particularly limited. By way of an example, the styrene content is preferably 5% by mass or more, more preferably 8% by mass or more, further preferably 15% by mass or more, and particularly preferably 25% by mass or more. Furthermore, the styrene content is preferably 60% by mass or less, more preferably 55% by mass or less, further preferably 45% by mass or less, and particularly preferably 33% by mass or less. When the styrene content of the SBR is within the above-described ranges, a rubber composition to be obtained can easily obtain sufficient grip performance and abrasion resistance. Besides, the styrene content of the SBR can be measured by $H^1$-NMR.

The vinyl content of the SBR is not particularly limited. By way of an example, the vinyl content is preferably 5 mol % or more, more preferably 8 mol % or more, further preferably 10 mol % or more, and particularly preferably 30 mol % or more. Furthermore, the vinyl content is preferably 50 mol % or less, more preferably 45 mol % or less, further preferably 40 mol % or less, and particularly preferably 36 mol % or less. When the vinyl content of the SBR is within the above-described ranges, a rubber composition to be obtained can easily obtain sufficient grip performance and abrasion resistance. Besides, the vinyl content of the SBR (1,2-bond butadiene unit amount) can be measured by infrared absorption spectrometry.

When the SBR is comprised in the diene-based rubber component, the content of the SBR is not particularly limited. By way of an example, the content of SBR is preferably 50% by mass or more, more preferably 60% by mass or more, and further preferably 70% by mass or more, in the rubber composition. It is particularly preferable that the diene-based rubber component include the SBR only. When the SBR content is within the above-described ranges, a rubber composition to be obtained can easily obtain sufficient heat resistance and grip performance. Besides, when two or more SBRs are used in combination, the total amount of SBR represents the content of SBR.

Examples of the BR include, but not particularly limited to, a high cis 1,4-polybutadiene rubber (a high cis BR), a butadiene rubber containing a 1,2-syndiotactic polybutadiene crystal (a SPB-containing BR), a modified butadiene rubber (a modified BR), a rare-earth-based BR, and the like. The BR may be used in combination.

(Branched Alkane of 40 to 70 Carbon Atoms)

The rubber composition for a tire tread comprises 0.50 to 6.00 parts by mass of a branched alkane of 40 to 70 carbon atoms based on 100 parts by mass of the diene-based rubber component. Such branched alkane does not bleed unless the environmental temperature is 60° C. or higher. Therefore, when a predetermined amount of such a branched wax is compounded, the rubber composition improves in mold releasability without causing whitening even during storage in a warehouse in the summer. Specifically, such a branched wax is considered to instantaneously bleed to a rubber surface before initiation of vulcanization and fill micro irregularities on a mold surface, so that it improves releasability from the mold. Furthermore, such a branched wax can solidify into a granule on the rubber surface. Therefore, the branched wax does not form a hard membrane on the rubber composition to be obtained, allowing a low molecular compound to permeate onto the membrane surface whereby preventing initial grip performance and ozone property from deteriorating. Moreover, since a bleeding substance of such a branched wax is in a liquid state with a low viscosity on the mold surface at a temperature of 150 to 190° C. at the time of mold release, the tire easily comes off from the mold. In addition, in order to well maintain the ozone property, a linear alkane of 20-32 carbon atoms and an antioxidant which will be described later can be appropriately compounded. When the branched alkane has 40 or more carbon atoms, the above-described bleeding easily occurs at the vulcanization temperature (for example, 150 to 200° C.). Furthermore, when the branched alkane has 70 or less carbon atoms, the rubber composition exhibits moderate viscosity, and slipperiness between the mold and the tire improves, and the rubber composition easily comes off from the mold. Moreover, the rubber composition exhibits a moderate membrane hardness even in a tire which is used. In addition, such a wax having more than 70 carbon atoms and a molecular weight of more than 1,000 has a high melting point and easily forms a hard membrane. On the other hand, as described above, the branched alkane of 40 to 70 carbon atoms does not form a hard membrane and thus is appropriate for a tire.

A method of setting the content of the branched alkane of 40 to 70 carbon atoms to a specific amount is not particularly limited. By way of an example, the rubber composition can comprise a content of the branched alkane of 40 to 70 carbon atoms in the above-described ranges by, for example, compounding a wax comprising a predetermined amount of a branched alkane of 40 to 70 carbon atoms into the rubber composition. Such a wax is not particularly limited. Examples of the wax include those manufactured and sold by Nippon Seiro Co., Ltd., and the like.

The content of the branched alkane of 40 to 70 carbon atoms may be 0.50 parts by mass or more, preferably 1.00 part by mass or more, more preferably 1.18 parts by mass or more, and more preferably 1.50 parts by mass or more, based on 100 parts by mass of the rubber component, from the viewpoints that it easily bleeds at the high temperature and gives an excellent releasability from the mold, etc. to a rubber composition to be obtained, and that, along with running, it easily bleeds with low molecule components passing through a gap of the branched alkanes and improves grip performance. Furthermore, the content of the branched alkane of 40 to 70 carbon atoms may be 6.00 parts by mass or less, preferably 5.50 parts by mass or less, and more preferably 5.00 parts by mass or less, based on 100 parts by mass of the rubber component, from the viewpoints that it is good in initial grip and whitening performance, and that it is less likely to be crystallized and forms a soft membrane so that it easily maintains the grip performance. In this regard, the content of the a branched alkane of 40 to 70 carbon atoms is preferably 3.20 parts by mass or less, and more preferably 1.30 parts by mass or less, from the viewpoint that the improvement effect of initial wet grip performance can be further favorably demonstrated.

(Linear Alkane of 45 or More Carbon Atoms)

The rubber composition for a tire tread comprises 0.05 to 3.50 parts by mass of a linear alkane of 45 or more carbon atoms based on 100 parts by mass of the diene-based rubber component. A method of setting the content of the linear alkane of 45 or more carbon atoms to a specific amount is not particularly limited. By way of an example, the rubber composition can comprise a content of the linear alkane of 45 or more carbon atoms in the above-described ranges by, for example, compounding a wax comprising a predetermined amount of a linear alkane of 45 or more carbon atoms into the rubber composition. Such a wax is not particularly limited. Examples of the wax include those manufactured and sold by Nippon Seiro Co., Ltd., and the like.

The content of the linear alkane of 45 or more carbon atoms is 0.05 parts by mass or more, preferably 0.11 parts by mass or more, more preferably 0.30 parts by mass or more, more preferably 0.40 parts by mass or more, more preferably 0.50 parts by mass or more, and more preferably 1.00 parts by mass or more, based on 100 parts by mass of the diene-based rubber component, from the viewpoint of good static ozone crack property under a high temperature environment. Furthermore, the content of the linear alkane of 45 or more carbon atoms is 3.50 parts by mass or less, preferably 3.00 parts by mass or less, more preferably 2.50 parts by mass or less, and more preferably 1.70 parts by mass or less, based on 100 parts by mass of the diene-based rubber component, from the viewpoints of suppressing whitening of the appearance of a rubber composition to be obtained and maintaining quality and durability. In this regard, the content of the linear alkane of 45 or more carbon atoms is preferably 0.75 parts by mass or less, more preferably 0.70 parts by mass or less, and further preferably 0.45 parts by mass or less, from the viewpoint that the improvement effect of initial wet grip performance can be further favorably demonstrated.

(Aluminum Hydroxide)

The rubber composition for a tire tread comprises 1 to 35 parts by mass of aluminum hydroxide based on 100 parts by mass of the diene-based rubber component. Aluminum hydroxide is not particularly limited, and those commonly used in the tire industry can be appropriately used. Examples of aluminum hydroxide include those manufactured and sold by Showa Denko K.K., Sumitomo Chemical Co., Ltd., etc.

The average primary particle size of aluminum hydroxide is preferably 0.5 µm or more, more preferably 0.8 µm or more, and further preferably 1 µm or more. Furthermore, the average primary particle size is preferably 10 µm or less, and more preferably 5 µm or less. When the average particle size of aluminum hydroxide is within the above-described ranges, in a tire obtained by using a rubber composition for a tire tread, good abrasion resistance and grip performance can be easily exhibited. Besides, the average primary particle size of aluminum hydroxide is a number average particle size and expressed as an average of values obtained by measuring any 100 particle sizes with a transmission type electron microscope.

The nitrogen adsorption specific surface area ($N_2SA$) of aluminum hydroxide is preferably 3.0 $m^2/g$ or more, more preferably 4.0 $m^2/g$ or more, more preferably 5.0 $m^2/g$ or more, and further preferably 6.7 $m^2/g$ or more, from the viewpoint of grip performance. Furthermore, the $N_2SA$ of aluminum hydroxide is preferably 60.0 $m^2/g$ or less, more preferably 50.0 $m^2/g$ or less, more preferably 35.0 $m^2/g$ or less, more preferably 19.0 $m^2/g$ or less, and further preferably 13.0 $m^2/g$ or less, from the viewpoints of dispersibility and reaggregation prevention of aluminum hydroxide, and abrasion resistance. Besides, the $N_2SA$ of aluminum hydroxide is a value measured by the BET method according to ASTM D3037-81.

The content of aluminum hydroxide is 1 part by mass or more, preferably 3 parts by mass or more, more preferably 5 parts by mass or more, more preferably 10 parts by mass or more, and more preferably 15 parts by mass or more, based on 100 parts by mass of the diene-based rubber component. When the content of aluminum hydroxide is less than 1 part by mass, there is a tendency that an improvement effect of sufficient wet grip performance cannot be obtained. Furthermore, the content of aluminum hydroxide is 35 parts by mass or less, preferably 30 parts by mass or less, more preferably 25 parts by mass or less, more preferably 23 parts by mass or less, further preferably 21 parts by mass or less, and particularly preferably 20 parts by mass or less, based on 100 parts by mass of the diene-based rubber component. When the content of aluminum hydroxide exceeds 35 parts by mass, the abrasion resistance tends to deteriorate, and aluminum hydroxides tend to aggregate, reducing the breaking strength. In this regard, the content of aluminum hydroxide is preferably 21 parts by mass or more from the viewpoint that the improvement effect of the initial wet grip performance can be further favorably demonstrated.

(Optional Components)

Next, optional components that are appropriately compounded in the rubber composition for a tire tread will be described. The rubber composition for a tire tread is optionally compounded with other components commonly used in manufacturing of the rubber composition in addition to the above-described components. By way of an example, such optional components include a filler, a low temperature plasticizer, a liquid SBR, oil, a tackifying resin, wax, an antioxidant, a compatibilizing resin, processing aid, stearic acid, zinc oxide, a vulcanization agent, a vulcanization accelerator, and the like.

(Filler)

When a filler is used, the filler is not particularly limited. By way of an example, the filler includes carbon black, silica, a diatomaceous earth, calcium carbonate, talc, and the like. Besides, the filler herein does not include aluminum hydroxide.

The total content of the filler is 60 parts by mass or more, preferably 70 parts by mass or more, and further preferably 80 parts by mass or more, based on 100 parts by mass of the rubber component, from the viewpoints of obtaining sufficient reinforcing property of a rubber composition to be obtained, and an excellent thermal conductivity. When the total content of the filler is 60 parts by mass or more, the grip performance and the reinforcing property tend to be improved. Furthermore, the total content of the filler is preferably 150 parts by mass or less, more preferably 130 parts by mass or less, and further preferably 111 parts by mass or less. When the total content of the filler is 150 parts by mass and less, there is a tendency that the filler becomes excellent in dispersibility as a whole, and a rubber composition to be obtained becomes excellent in durability and improved in processability.

Carbon black is not particularly limited. By way of an example, carbon black includes furnace black, acetylene black, thermal black, channel black, graphite (black lead), and the like. These carbon blacks may be used in combination.

The nitrogen adsorption specific surface area ($N_2SA$) of carbon black is preferably 40 $m^2/g$ or more, and more preferably 60 $m^2/g$ or more, from the viewpoint of improving the durability. Furthermore, the $N_2SA$ is preferably 300 $m^2/g$ or less, more preferably 140 $m^2/g$ or less, and further preferably 114 $m^2/g$ or less, from the viewpoints of favorably securing dispersibility of carbon black and thermal conductivity. Besides, the $N_2SA$ of carbon black is a value measured by the BET method according to ASTM D3037-81.

The content of carbon black is preferably 2 parts by mass or more, more preferably 3 parts by mass or more, and further preferably 31 parts by mass or more, based on 100 parts by mass of the rubber component, from the viewpoints of sufficient ultraviolet crack property and reinforcing property and excellent thermal conductivity of a rubber composition to be obtained. Furthermore, the content of carbon black is preferably 90 parts by mass or less, and more preferably 80 parts by mass or less, from the viewpoints of excellent breaking elongation and crack growth property Silica is not particularly limited. By way of an example, as silica, those commonly used in the tire industry can be used. Examples of silica include those manufactured and sold by Rhodia, Evonik Degussa GmbH, etc.

The nitrogen adsorption specific surface area ($N_2SA$) of silica is preferably 20 $m^2/g$ or more, more preferably 30 $m^2/g$ or more, more preferably 50 $m^2/g$ or more, more preferably 114 $m^2/g$ or more, more preferably 150 $m^2/g$ or more, more preferably 180 $m^2/g$ or more, and further preferably 205 $m^2/g$ or more, from the viewpoint of obtaining a sufficient reinforcing property. Furthermore, the $N_2SA$ of silica is preferably 500 $m^2/g$ or less, more preferably 400 $m^2/g$ or less, more preferably 250 $m^2/g$ or less, and more preferably 240 $m^2/g$ or less. Besides, the $N_2SA$ of silica is a value measured by the BET method according to ASTM D3037-81.

The content of silica is preferably 10 parts by mass or more, more preferably 30 parts by mass or more, more preferably 50 parts by mass or more, and further preferably 80 parts by mass or more, based on 100 parts by mass of the rubber component, from the viewpoints of wet grip performance and fuel efficiency. Furthermore, the content of silica preferably 130 parts by mass or less, more preferably 120 parts by mass or less, more preferably 110 parts by mass or less, and further preferably 100 parts by mass or less, from the viewpoint of dispersibility of silica.

When silica is used as a filler, a silane coupling agent is preferably comprised. As a silane coupling agent, conventionally known silane coupling agents can be used, and examples of the silane coupling agent include, for example, sulfide-based silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl) tetrasulfide, bis(4-trimethoxysilylbutyl)tetrasulfide, bis(3-triethoxysilylpropyl)trisulfide, bis(2-triethoxysilylethyl) trisulfide, bis(4-triethoxysilylbutyl)trisulfide, bis(3-trimethoxysilylpropyl)trisulfide, bis(2-trimethoxysilylethyl) trisulfide, bis(4-trimethoxysilylbutyl)trisulfide, bis(3-triethoxysilylpropyl) disulfide, bis(2-triethoxysilylethyl) disulfide, bis(4-triethoxysilylbutyl)disulfide, bis(3-trimethoxysilylpropyl) disulfide, bis(2-trimethoxysilylethyl) disulfide, bis(4-trimethoxysilylbutyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropyl benzothiazolyl tetrasulfide, 3-triethoxysilylpropyl benzothiazole tetrasulfide, and 3-trimethoxysilylpropyl methacrylate monosulfide; mercapto-based silane coupling agents such as 3-mercaptopropyltrimethoxysilane, 3-mercaptopropyltriethoxysilane, 2-mercaptoethyltrimethoxysilane, and 2-mercaptoethyltriethoxysilane; vinyl-based silane coupling agents such as vinyltriethoxysilane and vinyltrimethoxysilane; amino-based silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy-based silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro-based silane coupling agents such as 3-nitropropyltrimethoxysilane and 3-nitropropyltriethoxysilane; chloro-based silane coupling agents such as 3-chloropropyltrimethoxysilane, 3-chloropropyltriethoxysilane, 2-chloroethyltrimethoxysilane, and 2-chloroethyltriethoxysilane; and the like. These silane coupling agents may be used alone, or two or more thereof may be used in combination. Among them, bis(3-triethoxysilylpropyl)tetrasulfide, bis(2-triethoxysilylethyl)tetrasulfide, and the like are preferable from the viewpoint of good processability.

The content of the silane coupling agent when used is preferably 4 parts by mass or more, and more preferably 6 parts by mass or more, based on 100 parts by mass of silica. Furthermore, the content of the silane coupling agent is preferably 25 parts by mass or less, and more preferably 22 parts by mass or less, based on 100 parts by mass of silica. When the content of the silane coupling agent is 4 parts by mass or more, the dispersibility of the filler in the rubber composition can be improved. Moreover, when the content of the silane coupling agent is 25 parts by mass or less, the filler is favorably dispersed in the rubber composition, and the reinforcing property of a tire to be obtained is easily improved.

(Low Temperature Plasticizer)

A low temperature plasticizer can be further compounded to the rubber composition for a tire tread. Examples of the low temperature plasticizer include, for example, liquid components such as dioctyl phthalate (DOP), dibutyl phthalate (DBP), tris(2-ethylhexyl)phosphate (TOP), and bis(2-ethylhexyl)sebacate (DOS).

The compounding amount of the low-temperature plasticizer when used is preferably 5 parts by mass or more, more preferably 10 parts by mass or more, and further preferably 18 parts by mass or more, based on 100 parts by mass of the diene-based rubber component. Furthermore, the content of the low-temperature plasticizer is preferably 40 parts by mass or less, and more preferably 30 parts by mass or less. When the content of the low temperature plasticizer is within the above-described ranges, a plasticizing effect at low temperature and a good grip performance at high temperature tend to be easily obtained.

(Liquid Diene-Based Polymer)

Examples of the liquid diene-based polymer include a liquid styrene-butadiene copolymer (a liquid SBR), a liquid butadiene polymer (a liquid BR), a liquid isoprene polymer (liquid IR), a liquid styrene isoprene copolymer (a liquid SIR), and the like. Among them, a liquid SBR is preferred because a good balance between abrasion resistance and steering stability during running can be obtained. Besides, the liquid diene-based polymer herein is a diene-based polymer in a liquid state at room temperature (25° C.).

The weight-average molecular weight (Mw) of the liquid diene-based polymer in terms of polystyrene measured by gel permeation chromatography (GPC) is preferably $1.0 \times 10^3$ or more, more preferably $3.0 \times 10^3$ or more, and further preferably $5.0 \times 10^3$ or more, from the viewpoints of abrasion resistance, breaking property, and durability. Furthermore, it is preferably $2.0 \times 10^5$ or less, more preferably $1.5 \times 10^4$ or less, and further preferably $5.0 \times 10^3$ or less, from the viewpoint of productivity. Besides, the Mw of the liquid diene-based polymer herein is a value in terms of polystyrene measured by gel permeation chromatography (GPC).

The content of the liquid diene-based polymer when compounded is preferably 3 parts by mass or more, more preferably 5 parts by mass or more, and further preferably 13 parts by mass or more, based on 100 parts by mass of the rubber component. Furthermore, the content of the liquid diene-based polymer is preferably 30 parts by mass or less, more preferably 20 parts by mass or less, more preferably 17 parts by mass or less, and further preferably 13 parts by mass or less. When the content of the liquid diene-based polymer is within the above-described ranges, improvement effects of good wet grip performance and initial wet grip performance tend to be easily obtained.

(Tackifying Resin)

Examples of the tackifying resin include resins conventionally used in the rubber compositions for tires such as aromatic-based petroleum resins. Examples of the aromatic-based petroleum resin include, for example, a phenol-based resin, a coumarone indene resin, a terpene resin, a styrene resin, an acrylic resin, a rosin resin, a dicyclopentadiene resin (a DCPD resin), and the like. Examples of the phenol-based resin include Koresin (manufactured by BASF), TACKIROL (manufactured by Taoka Chemical Co., Ltd.), and the like. Examples of the coumarone indene resin include, for example, Coumarone (manufactured by Nitto Chemical Industry Co., Ltd.), Escuron (manufactured by Nippon Steel & Sumikin Chemical Co., Ltd.), Neopolymer (manufactured by JXTG Nippon Oil & Energy Corporation), and the like. Examples of the styrene resin include, for example, Sylvatraxx (registered trademark) 4401 (manufactured by Arizona Chemical Company) and the like. Examples of the terpene resin include, for example, TR7125 (manufactured by Arizona Chemical Company), TO125 (manufactured by Yasuhara Chemical Co., Ltd.), and the like.

The softening point of the tackifying resin is preferably 40° C. or higher, and more preferably 60° C. or higher. When the softening point is 40° C. or higher, a sufficient grip performance tends to be obtained. Furthermore, the softening point is preferably 135° C. or lower, more preferably 130° C. or lower, and further preferably 125° C. or lower. When the softening point is 135° C. or lower, a sufficient grip performance tends to be obtained. Besides, the softening point of the resin is a temperature at which a sphere drops when the softening point specified in JIS K 6220-1: 2001 is measured with a ring and ball softening point measuring device.

The content of the tackifying resin based on 100 parts by mass of the rubber component is preferably 3 parts by mass or more, and more preferably 5 parts by mass or more. When the content of the tackifying resin is 3 parts by mass or more, a sufficient grip performance tends to be obtained. Furthermore, the content of the tackifying resin is preferably 40 parts by mass or less, more preferably 35 parts by mass or less, and further preferably 29 parts by mass or less. When the content of the tackifying resin is 40 parts by mass or less, a sufficient abrasion resistance and a good fuel efficiency tend to be obtained.

(Process Oil)

The process oil is not particularly limited. By way of an example, the process oil includes a paraffin-based process oil, an aroma-based process oil, a naphthene-based process oil, a castor oil (for a vulcanization bladder), and the like. The process oil may be used in combination.

The content of the process oil when comprised is not particularly limited. By way of an example, the content of the process oil is preferably 1 part by mass or more, and more preferably 2 parts by mass or more, based on 100 parts by mass of the rubber component, from the viewpoints of having little influence on mold releasability, and improvement in plasticization of a rubber and filler dispersibility. Furthermore, the content of the process oil is preferably 40 parts by mass or less, more preferably 35 parts by mass or less, and further preferably 30 parts by mass or less, based on 100 parts by mass of the rubber component, from the viewpoint that a large amount of resins for improving the grip can be compounded. However, in compounding for a high viscosity and high grip performance for races, there may be a case where the content of the oil is 30 to 100 parts by mass based on 100 parts by mass of the rubber component.

(Antioxidant)

The antioxidant is not particularly limited. Conventionally, the antioxidant can be optionally selected from various antioxidants commonly used in the rubber composition. By way of an example, the antioxidant includes a quinoline-based antioxidant, a quinone-based antioxidant, a phenol-based antioxidant, a phenylenediamine-based antioxidant, and the like. The antioxidant may be used in combination.

The content of the antioxidant when comprised is not particularly limited. By way of an example, the content of the antioxidant is preferably 0.1 parts by mass or more, and more preferably 0.5 parts by mass or more, based on 100 parts by mass of the rubber component. Furthermore, the content of the antioxidant is preferably 10 parts by mass or less, more preferably 7 parts by mass or less, and further preferably 4.3 parts by mass or less, based on 100 parts by mass of the rubber component. When the content of the antioxidant is within the above-described ranges, a filler improves in oxidation resistance and a good tensile property tends to be exhibited. Moreover, a rubber composition to be obtained is easily to be kneaded. The antioxidant (for example, a phenylenediamine-based antioxidant) has a slower bleeding rate than the above-described wax comprising the branched alkane and the like. However, for example, when 4 parts by mass or more of the phenylenediamine-based antioxidant is comprised based on 100 parts by mass of the rubber component, the bleeding rate is increased and the static ozone property can be improved even immediately after the production.

(Compatibilizing Resin)

The rubber composition for a tire tread preferably comprises an ethylene-propylene-styrene copolymer resin as a compatibilizing resin from the viewpoint of improving durability of a rubber composition to be obtained. The ethylene-propylene-styrene copolymer resin is a copolymer resin obtained by polymerizing a styrene monomer with an ethylene monomer and a propylene monomer, and comprises a structural unit represented by the following general formula (wherein, each of m, n and o is an integer of 1 or more). Since the rubber composition comprises the ethylene-propylene-styrene copolymer resin, the durability is maintained to the same extent as compared with the case where the rubber composition comprises the above-described terpene resin or rosin resin, and at the time of production of a vulcanization bladder, the tack on the rubber surface is less likely to rise up, and defects due to over-adhesion with a bladder mold hardly occurs.

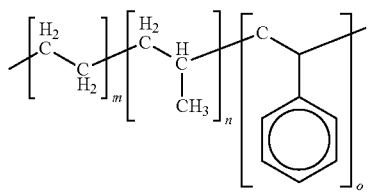

The total amount of ethylene-derived structural units and propylene-derived structural units (EP content, sum of m and n in the above-described formula relative to the number of total structural units) in the ethylene-propylene-styrene copolymer resin is not particularly limited. By way of an example, the total amount is preferably 60 mol % or more, and more preferably 70 mol % or more, based on 100 mol % of the structural unit, from the viewpoint of eliminating gaps between a butyl-based rubber and a filler to improve air permeability property. Furthermore, the total amount is preferably 98 mol % or less, and more preferably 95 mol % or less, based on 100 mol % of the structural unit, from the viewpoint of tensile property. Both ethylene and propylene can be compatible with a butyl-based rubber. In addition, styrene can be compatible with carbon black. Therefore, when the EP content is within the above-described ranges, the balance between the air permeability property and EB can be improved.

The content of the ethylene-propylene-styrene copolymer resin when comprised is preferably 1 part by mass or more, more preferably 2 parts by mass or more, and further preferably 3.5 parts by mass or more, based on 100 parts by mass of the rubber component, from the viewpoint that the improvement effect of initial wet grip performance can be favorably demonstrated. Furthermore, the content of the ethylene-propylene-styrene copolymer resin is preferably 8 parts by mass or less, more preferably 6 parts by mass or less, and further preferably 3.5 parts by mass or less, from the viewpoint that hardness, moldability and viscosity of a rubber composition can be appropriately secured.

Commercially available products may be used as an ethylene-propylene-styrene copolymer resin. Examples of such commercially available products include those manufactured and sold by Struktol Company of America, LCC, Performance Additives, LANXESS, etc.

(Processing Aid)

Examples of processing aid include, for example, a fatty acid metal salt, a fatty acid amide, an amide ester, a silica surface active agent, a fatty acid ester, a mixture of a fatty acid metal salt and an amide ester, a mixture of a fatty acid metal salt and a fatty acid amide, and the like. They may be used alone, or two or more thereof may be used in combination. Among them, a fatty acid metal salt, an amide ester, a mixture of a fatty acid metal salt and an amide ester, and a mixture of a fatty acid metal salt and a fatty acid amide are preferable, and a mixture of a fatty acid metal salt and a fatty acid amide is particularly preferable.

Examples of a fatty acid constituting the fatty acid metal salt, include, but not particularly limited to, a saturated or unsaturated fatty acid (preferably, $C_{6-28}$ (more preferably $C_{10-25}$, and further preferably $C_{14-20}$) saturated or unsaturated fatty acid), for example, a lauric acid, a myristic acid, a palmitic acid, a stearic acid, an oleic acid, a linoleic acid, a linolenic acid, an arachidic acid, a behenic acid, a nervonic acid, and the like. They may be used alone, or two or more thereof may be used in combination. Among them, saturated fatty acids are preferable, and a $C_{14-20}$ saturated fatty acids is more preferable.

Examples of a metal constituting the fatty acid metal salt include alkali metals such as potassium and sodium, alkaline earth metals such as magnesium, calcium and barium, zinc, nickel and molybdenum. Among them, zinc and calcium are preferable, and zinc is more preferable.

A saturated fatty acid amide or an unsaturated fatty acid amide may be used as the fatty acid amide. Examples of the saturated fatty acid amide include, for example, N-(1-oxooctadecyl)sarcosine, a stearic acid amide, a behenic acid amide, and the like. Examples of the unsaturated fatty acid amide include, for example, an oleic acid amide, an erucic acid amide, and the like.

Specific examples of the mixture of the fatty acid metal salt and the fatty acid amide include WB16 manufactured by Struktol Company of America, LCC, which is a mixture of a fatty acid calcium and a fatty acid amide, Ultra-Lube 160 manufactured by Performance Additives, which is a mixture of a fatty acid soap and a fatty acid amide, and the like. Furthermore, specific examples of a fatty acid zinc salt include Ultra-Flow 440 manufactured by Performance Additives, and the like.

The content of the processing aid when comprised based on 100 parts by mass of the rubber component is preferably 0.8 parts by mass or more, more preferably 1.5 parts by mass or more, and further preferably 3.0 parts by mass or more. When it is less than 0.8 parts by mass, the effect of addition may not be sufficiently obtained. Furthermore, the content of the processing aid is preferably 10 parts by mass or less, more preferably 8 parts by mass or less, and further preferably 6 parts by mass or less. When it exceeds 10 parts by mass, slipping between polymer phases occurs, making it difficult to form a structure in which the polymer phases are intertwined with each other, and leading to a tendency that the abrasion resistance tends to deteriorate and that the breaking strength tends to decrease.

In addition, as stearic acid, zinc oxide, etc., those conventionally used in the rubber industry can be used.

(Vulcanizing Agent)

The vulcanizing agent is not particularly limited, and those commonly used in the rubber industry can be used, but those comprising a sulfur atom are preferable, for example, powdery sulfur, precipitated sulfur, colloidal sulfur, surface-treated sulfur, insoluble sulfur, and the like.

(Vulcanization Accelerator)

Examples of the vulcanization accelerator include, but not particularly limited to, for example, sulfenamide-based, thiazole-based, thiuram-based, thiourea-based, guanidine-based, dithiocarbamic acid-based, aldehyde-amine-based or aldehyde-ammonia-based, imidazolin-based, and xanthate-based vulcanization accelerators, and the like. Among them, sulfenamide-based and guanidine-based vulcanization accelerators are preferable from the viewpoint that the improvement effect of initial wet grip performance can be more favorably demonstrated.

Examples of the sulfenamide-based vulcanization accelerator include CBS N-cyclohexyl-2-benzothiazolylsulfenamide), TBBS (N-t-butyl-2-benzothiazolylsulfenamide), N-oxyethylene-2-benzothiazolylsulfenamide, N,N'-diisopropyl-2-benzothiazolylsulfenamide, N,N-dicyclohexyl-2-benzothiazolylsulfenamide, CZ (N-cyclohexyl-2-benzothiazolylsulfenamide), and the like. Examples of the thiazole-based vulcanization accelerator include 2-mercaptobenzothiazole, dibenzothiazolyl disulfide, and the like. Examples of the thiuram-based vulcanization accelerator include tetramethylthiuram monosulfide, tetramethylthiuram disulfide, tetrabenzylthiuram disulfide (TBzTD), and the like. Examples of the guanidine-based vulcanization accelerator include diphenylguanidine (DPG), dioltotolylguanidine, orthotolylbiguanidine, and the like. They may be used alone, or two or more thereof may be used in combination. Among them, CZ and DPG are preferably used from the viewpoint that the improvement effect of initial wet grip performance can be more favorably demonstrated.

The content of the vulcanization accelerator when comprised based on 100 parts by mass of the rubber component is preferably 0.1 parts by mass or more, more preferably 0.3 part by mass or more, and further preferably 0.5 parts by mass or more. The content of the vulcanization accelerator based on 100 parts by mass of the rubber component is preferably 9 parts by mass or less, more preferably 8 parts by mass or less, further preferably 7 parts by mass or less, and particularly preferably 5.8 parts by mass or less. When the content of the vulcanization accelerator is within the above-described ranges, appropriate breaking property can be obtained, and the abrasion resistance tends to be improved.

In a preferred embodiment, the rubber composition for a tread comprises a diene-based rubber component, and, based on 100 parts by mass of the diene-based rubber component, 1.5 to 5.0 parts by mass of a branched alkane of 40 to 70 carbon atoms, 1.0 to 2.5 parts by mass of a linear alkane of 45 or more of carbon atoms and 10 to 21 parts by mass of aluminum hydroxide, and, further preferably, the rubber composition for a tread has 0.90 to 1.15 of dynamic coefficient of friction measured with a dynamic friction tester under measurement conditions of a speed at 7.8 km/h, a temperature at 20° C., and a water layer thickness of 2 mm±1 mm.

<Method of Manufacturing Rubber Composition for Tread>

A method of manufacturing a rubber composition for a tread is not particularly limited, and a known method can be used. For example, it can be manufactured by a method of kneading each of the above-described components using a rubber kneading apparatus such as an open roll, Banbury mixer, and a closed type kneader followed by vulcanizing it. For example, the kneading step includes kneading for 2 to 3 minutes at 150° C. to 165° C., preferably 155° C. to 160° C., and the vulcanizing step includes vulcanizing for 12 to 18 minutes at 170° C. to 180° C.

<Method of Manufacturing Tire>

A tire comprising a tread composed of the above-described rubber composition for a tread can be manufactured by a usual method using the above-described rubber composition for a tread. That is, a tire can be manufactured by extruding the above-described rubber composition prepared by compounding the above-described compounding agents to the diene-based rubber component into a tread shape as necessary, attaching them together with other tire members on a tire forming machine, and molding them in a usual manner, thereby forming an unvulcanized tire, followed by heating and pressurizing this unvulcanized tire in a vulcanizing machine.

The tire can be used as a general tire such as a tire for a passenger car, a high performance tire for a passenger car, a heavy duty tire for a truck, bus, or the like, a racing tire, and the like. Among them, a tire for a passenger car is preferable from the viewpoint of the improvement effect of grip performance on a wet road.

EXAMPLE

The present invention will be described in detail based on Examples. The present invention is not limited to these Examples.

Various chemicals used in Examples and Comparative examples are shown below.

SBR 1: T3830 (S-SBR, styrene content: 33% by mass, amount of bonded vinyl: 36 mol %, an oil-extended product comprising 37.5 parts by mass of oil content based on 100 parts by mass of the rubber component) manufactured by Asahi Kasei Corporation SBR 2: Modified SBR (S-SBR, styrene content: 25% by mass, amount of bonded vinyl: 30 mol %, weight-average molecular weight (Mw): 500,000) manufactured in Manufacturing example 1

Silica: Nipsil AQ ($N_2SA$: 205 $m^2/g$) manufactured by Tosoh Corporation

Carbon black: Show Black N220 (a normal carbon, $N_2SA$: 114 $m^2/g$) manufactured by Cabot Japan K.K.

Aluminum hydroxide: HIGILITE H-43 (average primary particle size: 1 μm, $N_2SA$: 6.7 $m^2/g$) manufactured by Showa Denko K.K.

Silane coupling agent: Si69 (bis(3-triethoxysilylpropyl) tetrasulfide) manufactured by Evonik Degussa GmbH Low temperature plasticizer: DOS (coagulation point: −62° C., viscosity: 18 mPa·s (25° C.)) manufactured by Daihachi Chemical Industry Co., Ltd.

Liquid styrene butadiene rubber (Liquid SBR): RICON 100 (Mw: 5000) manufactured by Sartomer Oil: Process oil A/O mix manufactured by Sankyo Yuka Kogyo K.K.

Tackifying resin: YS resin TO125 (styrene terpene resin, softening point: 125° C., Tg: 64° C., SP value: 8.73, Mw: 800) manufactured by Yasuhara Chemical Co., Ltd.

Paraffin: OZOACE 0355 (melting point: 70° C.) manufactured by Nippon Seiro Co., Ltd.

Microcrystalline 1: Hi-Mic 1080 (melting point: 84° C.) manufactured by Nippon Seiro Co., Ltd.

Microcrystalline 2: Hi-Mic 1070 (melting point: 80° C.) manufactured by Nippon Seiro Co., Ltd.

Microcrystalline 3: Hi-Mic 1045 (melting point: 72° C.) manufactured by Nippon Seiro Co., Ltd.

Antioxidant 1: Antigen 6C (N-phenyl-N'-(1,3-dimethylbutyl)-p-phenylenediamine) manufactured by Sumitomo Chemical Co., Ltd.

Antioxidant 2: Nocrac RD (poly(2,2,4-trimethyl-1,2-dihydroquinoline)) manufactured by Ouchi Shinko Chemical Industrial Co., Ltd.

Compatibilizing resin: Struktol 40MS (an ethylene-propylene-styrene copolymer resin, SP value: 8.9, softening point: 101° C., Tg: 58° C.) manufactured by Struktol Company of America Processing aid: ULTRA-LUBE 160 (a mixture of a fatty acid soap and a fatty acid amide) manufactured by Performance Additives Stearic acid: BEAD STEARIC ACID CAMELLIA manufactured by NOF CORPORATION Zinc oxide: Zinc flower No. 1 manufactured by Mitsui Mining & Smelting Co., Ltd.

Sulfur: HK-200-5 (oil content 5% by mass) manufactured by Hosoi Chemical Industry Co., Ltd.

Vulcanization accelerator 1: Nocceler CZ (N-cyclohexyl-2-benzothiazolylsulfenamide) manufactured by Ouchi Shinko Chemical Industrial Co., Ltd.

Vulcanization accelerator 2: Nocceller D (DPG, 1,3-diphenylguanidine) manufactured by Ouchi Shinko Chemical Industrial Co., Ltd.

Manufacturing Example 1 (Manufacturing of Modified SBR)

A stainless steel polymerization reactor with an internal volume of 30 liter equipped with a stirrer was washed and dried to replace gas inside the polymerization reactor with dry nitrogen. Next, 15.3 kg of industrial hexane (density: 680 kg/$m^3$), 912 g of 1,3-butadiene, 288 g of styrene, 9.1 ml of tetrahydrofuran, and 6.4 ml of ethylene glycol diethyl ether were put into the polymerization reactor. Then, a small amount of n-butyllithium in a hexane solution was put into the polymerization reactor as a scavenger in order to detoxify impurities that deactivate the polymerization initiator in advance. N-butyllithium in n-hexane solution (n-butyllithium content: 19.2 mmol) was put into the polymerization reactor to start a polymerization reaction. The polymerization reaction was continued for 3 hours. During the polymerization reaction, the temperature in the polymerization reactor was adjusted to 65° C., the solution in the polymerization reactor was stirred at a stirring speed of 130 rpm, and 1,368 g of 1,3-butadiene and 432 g of styrene were continuously fed into the polymerization reactor. 20 ml of a THF solution comprising 19.2 mmol of 2-[1-(2-hydroxy-3, 5-di-t-pentylphenyl)ethyl]-4,6-di-t-pentylphenyl acrylate was put into the polymerization reactor, and the polymer solution was stirred for 15 minutes. Next, 20 ml of a hexane solution comprising 1.2 ml of methanol was put into the polymerization reactor, and the polymer solution was stirred for 5 minutes. 12.0 g of 2-tert-butyl-6-(3-tert-butyl-2-hydroxy-5-methylbenzyl)-4-methylphenyl acrylate (SUMILIZER GM manufactured by Sumitomo Chemical Co., Ltd.) and 6.0 g of pentaerythrityl tetrakis(3-lauryl thiopropionate) (SUMILIZER TP-D manufactured by Sumitomo Chemical Co., Ltd.) were put into the polymerization reactor, and then the polymer solution was evaporated at room temperature for 24 hours and further dried under reduced pressure at 55° C. for 12 hours to obtain a polymer, modified SBR.

Examples and Comparative Examples

According to the formulations shown in Tables 1 to 3, a 1.7 L closed Banbury mixer was used to knead chemicals other than sulfur and vulcanization accelerators at a discharge temperature of 155° C. for 3 minutes to obtain a kneaded product. Next, using a biaxial open roll, sulfur and vulcanization accelerators were added to the obtained kneaded product, and the mixture was kneaded at a discharge temperature of 100° C. for 1 minute to obtain an unvulcanized rubber composition. The obtained unvulcanized rubber composition was cut into a test piece and vulcanized at 170° C. for 18 minutes to obtain a vulcanized rubber test piece.

Furthermore, the unvulcanized rubber composition is extruded into a tread shape with an extruder equipped with a mouthpiece having a predetermined shape and attached together with other tire members to form an unvulcanized tire, and the unvulcanized tire was press-vulcanized at 180° C. for 15 minutes to obtain a pneumatic tire for testing (size 255/40R18). The obtained vulcanized rubber composition, rubber composition for testing (vulcanized rubber test piece), and pneumatic tire for testing were evaluated as follows. The results are shown in Tables 1 to 3. Besides, in the tables, branched alkanes of 40 to 70 carbon atoms, linear alkanes of 20 to 32 carbon atoms, and linear alkanes of 45 or more carbon atoms shall be comprised in a compounded wax (paraffin and microcrystalline), which can be calculated from a fragment amount when the temperature is raised stepwise in a gas chromatogram.

<Dynamic Coefficient of Friction>

According to a known measurement method using a dynamic friction tester (a DF tester) manufactured by Nippo Ltd., it was confirmed that water was slowly sprinkled on a road surface to form a water layer on the upper part thereof, and a dynamic coefficient of friction (ρ) was measured (measurement conditions: speed at 7.8 km/h, temperature at 20° C., water film thickness: 2 mm±1 mm) while increasing the linear velocity of the test piece (vulcanized rubber test piece) to 7.8 km/h. The larger the dynamic coefficient of friction (p) is, the higher the initial wet grip performance and the driving safety are.

<Initial Wet Grip Performance Index>

The pneumatic tire for testing was mounted on a domestic FR vehicle with a displacement of 2,000 cc. The vehicle was subjected to an actual run for 10 laps on a test course with a wet asphalt road surface. At that time, stability of a steering control on the second lap was evaluated by a test driver with a score of 1 to 10, and score of Comparative example 3 was set as 5.0 (initial wet grip performance index). The results indicate that the larger the value is, the higher the initial wet grip performance is.

TABLE 1

|  | Examples | | | | | | | | |
| --- | --- | --- | --- | --- | --- | --- | --- | --- | --- |
|  | 1 | 2 | 3 | 4 | 5 | 6 | 7 | 8 | 9 |
| Compounding amount (part) | | | | | | | | | |
| SBR 1 | 80 | 80 | 80 | 80 | 80 | 80 | 80 | 80 | 80 |
| SBR 2 | 20 | 20 | 20 | 20 | 20 | 20 | 20 | 20 | 20 |
| Silica | 80 | 80 | 80 | 80 | 80 | 80 | 80 | 80 | 80 |
| Carbon black | 31 | 31 | 31 | 31 | 31 | 31 | 31 | 31 | 31 |
| Aluminum hydroxide | 21 | 21 | 10 | 5 | 30 | 21 | 21 | 21 | 21 |
| Silane coupling agent | 17 | 17 | 17 | 17 | 17 | 17 | 17 | 17 | 17 |
| Low temperature plasticizer | 18 | — | — | — | — | — | — | — | — |
| Liquid SBR | 13 | 13 | 13 | 13 | 13 | 13 | — | 13 | 13 |
| Oil | 30 | 30 | 30 | 30 | 30 | 30 | 30 | 30 | 30 |
| Tackifying resin | 29 | 29 | 29 | 29 | 29 | — | 29 | 29 | 29 |
| Paraffin | 1.5 | — | 1.5 | 1.5 | 1.5 | 1.5 | 1.5 | 1.5 | 1.5 |
| Microcrystalline 1 | 1.0 | 2.5 | 1.0 | 1.0 | 1.0 | 1.0 | 1.0 | — | — |
| Microcrystalline 2 | — | — | — | — | — | — | — | 1.0 | — |
| Microcrystalline 3 | — | — | — | — | — | — | — | — | 1.0 |
| (Branched alkanes of 40 to 70 carbon atoms) | 0.59 | 1.20 | 0.59 | 0.59 | 0.59 | 0.59 | 0.59 | 0.66 | 0.76 |
| (Linear alkanes of 20 to 32 carbon atoms) | 0.81 | 0.13 | 0.81 | 0.81 | 0.81 | 0.81 | 0.81 | 0.81 | 0.82 |
| (Linear alkanes of 45 or more carbon atoms) | 0.34 | 0.70 | 0.34 | 0.34 | 0.34 | 0.34 | 0.34 | 0.27 | 0.15 |
| Antioxidant 1 | 2.8 | 2.8 | 2.8 | 2.8 | 2.8 | 2.8 | 2.8 | 2.8 | 2.8 |
| Antioxidant 2 | 1.5 | 1.5 | 1.5 | 1.5 | 1.5 | 1.5 | 1.5 | 1.5 | 1.5 |
| Compatibilizing resin | 3.5 | 3.5 | 3.5 | 3.5 | 3.5 | 3.5 | 3.5 | 3.5 | 3.5 |
| Processing aid | 3.0 | 3.0 | 3.0 | 3.0 | 3.0 | 3.0 | 3.0 | 3.0 | 3.0 |
| Stearic acid | 1.5 | 1.5 | 1.5 | 1.5 | 1.5 | 1.5 | 1.5 | 1.5 | 1.5 |
| Zinc oxide | 4.2 | 4.2 | 4.2 | 4.2 | 4.2 | 4.2 | 4.2 | 4.2 | 4.2 |
| Sulfur | 1.6 | 1.6 | 1.6 | 1.6 | 1.6 | 1.6 | 1.6 | 1.6 | 1.6 |
| Vulcanization accelerator 1 | 3.8 | 3.8 | 3.8 | 3.8 | 3.8 | 3.8 | 3.8 | 3.8 | 3.8 |
| Vulcanization accelerator 2 | 2.0 | 2.0 | 2.0 | 2.0 | 2.0 | 2.0 | 2.0 | 2.0 | 2.0 |
| Evaluation | | | | | | | | | |
| Dynamic coefficient of friction ($\mu$) | 1.05 | 1.15 | 0.95 | 0.95 | 1.10 | 0.95 | 0.95 | 1.00 | 1.05 |
| Initial wet grip performance index | 7.5 | 8.5 | 6.5 | 6.5 | 8.0 | 6.5 | 6.5 | 7.0 | 7.5 |

TABLE 2

| | Examples | | | | | | | | | |
|---|---|---|---|---|---|---|---|---|---|---|
| | 10 | 11 | 12 | 13 | 14 | 15 | 16 | 17 | 18 | 19 |
| Compounding amount (part) | | | | | | | | | | |
| SBR 1 | 80 | 80 | 80 | 80 | 80 | 80 | 80 | 80 | 80 | 80 |
| SBR 2 | 20 | 20 | 20 | 20 | 20 | 20 | 20 | 20 | 20 | 20 |
| Silica | 80 | 80 | 80 | 80 | 80 | 80 | 80 | 80 | 80 | 80 |
| Carbon black | 31 | 31 | 31 | 31 | 31 | 31 | 31 | 31 | 31 | 31 |
| Aluminum hydroxide | 21 | 21 | 10 | 5 | 30 | 21 | 21 | 21 | 21 | 21 |
| Silane coupling agent | 17 | 17 | 17 | 17 | 17 | 17 | 17 | 17 | 17 | 17 |
| Low temperature plasticizer | — | — | — | — | — | — | — | — | — | — |
| Liquid SBR | 13 | 13 | 13 | 13 | 13 | 13 | — | 13 | 13 | 13 |
| Oil | 30 | 30 | 30 | 30 | 30 | 30 | 30 | 30 | 30 | 30 |
| Tackifying resin | 29 | 29 | 29 | 29 | 29 | — | 29 | 29 | 29 | 29 |
| Paraffin | 1.5 | 1.5 | 1.5 | 1.5 | 1.5 | 1.5 | 1.5 | 1.5 | 1.5 | 1.5 |
| Microcrystalline 1 | 1.0 | 1.0 | 2.0 | 2.0 | 3.0 | 3.0 | 4.0 | 4.0 | 11 | 1.0 |
| Microcrystalline 2 | 1.0 | — | 2.0 | — | 3.0 | — | 4.0 | — | 1.0 | — |
| Microcrystalline 3 | — | 1.0 | — | 2.0 | — | 3.0 | — | 4.0 | — | — |
| (Branched alkanes of 40 to 70 carbon atoms) | 1.13 | 1.23 | 2.14 | 2.34 | 3.15 | 3.45 | 4.16 | 4.56 | 5.83 | 0.59 |
| (Linear alkanes of 20 to 32 carbon atoms) | 0.86 | 0.87 | 0.96 | 0.98 | 1.06 | 1.09 | 1.16 | 1.20 | 1.36 | 0.81 |
| (Linear alkanes of 45 or more carbon atoms) | 0.56 | 0.43 | 1.05 | 0.81 | 1.55 | 1.18 | 2.05 | 1.56 | 3.36 | 0.34 |
| Antioxidant 1 | 2.8 | 2.8 | 2.8 | 2.8 | 2.8 | 2.8 | 2.8 | 2.8 | 2.8 | 2.8 |
| Antioxidant 2 | 1.5 | 1.5 | 1.5 | 1.5 | 1.5 | 1.5 | 1.5 | 1.5 | 1.5 | 1.5 |
| Compatibilizing resin | 3.5 | 3.5 | 3.5 | 3.5 | 3.5 | 3.5 | 3.5 | 3.5 | 3.5 | 3.5 |
| Processing aid | 3.0 | 3.0 | 3.0 | 3.0 | 3.0 | 3.0 | 3.0 | 3.0 | 3.0 | 3.0 |
| Stearic acid | 1.5 | 1.5 | 1.5 | 1.5 | 1.5 | 1.5 | 1.5 | 1.5 | 1.5 | 1.5 |
| Zinc oxide | 4.2 | 4.2 | 4.2 | 4.2 | 4.2 | 4.2 | 4.2 | 4.2 | 4.2 | 4.2 |
| Sulfur | 1.6 | 1.6 | 1.6 | 1.6 | 1.6 | 1.6 | 1.6 | 1.6 | 1.6 | 1.6 |
| Vulcanization accelerator 1 | 3.8 | 3.8 | 3.8 | 3.8 | 3.8 | 3.8 | 3.8 | 3.8 | 3.8 | 3.8 |
| Vulcanization accelerator 2 | 2.0 | 2.0 | 2.0 | 2.0 | 2.0 | 2.0 | 2.0 | 2.0 | 2.0 | 2.0 |
| Evaluation | | | | | | | | | | |
| Dynamic coefficient of friction (μ) | 1.10 | 1.20 | 0.95 | 0.95 | 0.95 | 0.90 | 0.90 | 0.90 | 0.85 | 1.00 |
| Initial wet grip performance index | 8.0 | 9.0 | 6.5 | 6.5 | 6.5 | 6.0 | 6.0 | 6.0 | 5.5 | 7.0 |

TABLE 3

| | Comparative examples | | | | |
|---|---|---|---|---|---|
| | 1 | 2 | 3 | 4 | 5 |
| Compounding amount (part) | | | | | |
| SBR 1 | 80 | 80 | 80 | 80 | 80 |
| SBR 2 | 20 | 20 | 20 | 20 | 20 |
| Silica | 80 | 80 | 80 | 80 | 80 |
| Carbon black | 31 | 31 | 31 | 31 | 31 |
| Aluminum hydroxide | 21 | 21 | 21 | 10 | 21 |
| Silane coupling agent | 17 | 17 | 17 | 17 | 17 |
| Low temperature plasticizer | 18 | 18 | 18 | 18 | 18 |
| Liquid SBR | 13 | 13 | 13 | 13 | 13 |
| Oil | 30 | 30 | 30 | 30 | 30 |
| Tackifying resin | 29 | 29 | 29 | 29 | 25 |
| Paraffin | 2.5 | — | 1.5 | 1.5 | 8.0 |
| Microcrystalline 1 | — | — | — | — | 13 |
| Microcrystalline 2 | — | — | — | — | — |
| Microcrystalline 3 | — | — | — | — | — |
| (Branched alkanes of 40 to 70 carbon atoms) | 0.18 | — | 0.11 | 0.11 | 6.82 |
| (Linear alkanes of 20 to 32 carbon atoms) | 1.26 | — | 0.76 | 0.76 | 4.72 |
| (Linear alkanes of 45 or more carbon atoms) | 0.10 | — | 0.06 | 0.06 | 3.96 |
| Antioxidant 1 | 2.8 | 2.8 | 2.8 | 2.8 | 2.8 |
| Antioxidant 2 | 1.5 | 1.5 | 1.5 | 1.5 | 1.5 |
| Compatibilizing resin | 3.5 | 3.5 | 3.5 | 3.5 | 3.5 |
| Processing aid | 3.0 | 3.0 | 3.0 | 3.0 | 3.0 |
| Stearic acid | 1.5 | 1.5 | 1.5 | 1.5 | 1.5 |
| Zinc oxide | 4.2 | 4.2 | 4.2 | 4.2 | 4.2 |
| Sulfur | 1.6 | 1.6 | 1.6 | 1.6 | 1.6 |
| Vulcanization accelerator 1 | 3.8 | 3.8 | 3.8 | 3.8 | 3.8 |
| Vulcanization accelerator 2 | 2.0 | 2.0 | 2.0 | 2.0 | 2.0 |
| Evaluation | | | | | |
| Dynamic coefficient of friction (μ) | 0.80 | 0.80 | 0.80 | 0.75 | 0.75 |
| Initial wet grip performance index | 5.0 | 5.0 | 5.0 | 4.5 | 4.5 |

As shown in Tables 1 to 3, the rubber compositions for tire treads and tires in Examples were excellent in the improvement effect of the initial wet grip performance.

The invention claimed is:

1. A rubber composition for a tire tread, comprising
a diene-based rubber component;
a microcrystalline wax having a melting point of from 72 to 84° C.; and
an aluminum hydroxide having a nitrogen absorption specific surface area of 3.0 to 60.0 m2/g,
wherein the microcrystalline wax comprises a branched alkane of 40 to 70 carbon atoms and a linear alkane of 45 or more carbon atoms, and,
wherein, based on 100 parts by mass of the diene-based rubber component, a content of the branched alkane of 40 to 70 carbon atoms is 0.5 to 6.0 parts by mass, a content of the linear alkane of 45 or more carbon atoms is 0.05 to 3.5 parts by mass and a content of the aluminum hydroxide of a nitrogen absorption specific surface area of 3.0 to 60.0 m$^2$/g is 1 to 35 parts by mass.

2. A tire comprising a tread composed of the rubber composition for a tire tread of claim 1.

3. The rubber composition for a tire tread of claim 1, wherein the rubber composition further comprises 3 to 30 parts by mass of a liquid diene-based polymer.

4. The rubber composition for a tire tread of claim 1, wherein a content of the aluminum hydroxide is 10 parts by mass or more and 35 parts by mass or less based on 100 parts by mass of the diene-based rubber component.

5. The rubber composition for a tire tread of claim 1, wherein an average primary particle size of the aluminum hydroxide is 0.5 μm or more and 10 μm or less.

6. The rubber composition for a tire tread of claim 1, wherein the diene-based rubber component comprises 50% by mass or more of a styrene-butadiene rubber.

7. The rubber composition for a tire tread of claim 1, wherein the rubber composition further comprises silica.

8. The rubber composition for a tire tread of claim 3, wherein the liquid diene-based polymer comprises a liquid styrene-butadiene copolymer.

9. The rubber composition for a tire tread of claim 1, wherein the rubber composition further comprises a tackifying resin.

10. The rubber composition for a tire tread of claim 9, wherein the tackifying resin comprises a styrene terpene resin.

11. The rubber composition for a tire tread of claim 1, wherein the rubber composition further comprises a plasticizer.

12. The rubber composition for a tire tread of claim 11, wherein the plasticizer comprises bis(2-ethylhexyl)sebacate.

* * * * *